(12) United States Patent
Tibbitts

(10) Patent No.: US 7,436,865 B1
(45) Date of Patent: Oct. 14, 2008

(54) TUNABLE OPTICAL OSCILLATOR

(75) Inventor: Stephen A. Tibbitts, Spanaway, WA (US)

(73) Assignee: Jet City Electronics, Inc., Seattle, WA (US)

( * ) Notice: Subject to any disclaimer, the term of this patent is extended or adjusted under 35 U.S.C. 154(b) by 42 days.

(21) Appl. No.: 11/713,466

(22) Filed: Mar. 2, 2007

Related U.S. Application Data

(60) Provisional application No. 60/780,003, filed on Mar. 7, 2006.

(51) Int. Cl.
*H01S 3/10* (2006.01)
(52) U.S. Cl. .............................. 372/20; 372/25; 372/29; 372/38
(58) Field of Classification Search .................. 372/20, 372/25
See application file for complete search history.

(56) References Cited

U.S. PATENT DOCUMENTS

| | | | |
|---|---|---|---|
| 4,606,032 A | | 8/1986 | Scifres et al. |
| 5,500,762 A | * | 3/1996 | Uchiyama et al. ............ 359/326 |
| 5,699,371 A | * | 12/1997 | Handa et al. .................... 372/6 |
| 5,917,179 A | | 6/1999 | Yao |
| 6,654,392 B1 | | 11/2003 | Arbore et al. |
| 6,654,394 B1 | * | 11/2003 | Sellin et al. .................... 372/32 |
| 6,680,472 B1 | * | 1/2004 | Thingbø et al. ......... 250/227.12 |
| 6,847,265 B2 | | 1/2005 | Tanaka et al. |

OTHER PUBLICATIONS

X. Steve Yao, Larry Davis, Lute Maleki, 'Coupled Optoelectronic Oscillators for Generating Both RF Signal and Optical Pulses', 2000, pp. 73-78, vol. 18 No. 1, . . . Journal of Lightwave Technology.

* cited by examiner

*Primary Examiner*—Dung T Nguyen
(74) *Attorney, Agent, or Firm*—Black Lowe & Graham PLLC

(57) ABSTRACT

A tunable optical oscillator with a period based on the speed of light is used to produce a periodic pulsed light signal with low jitter, low drift and high spectral purity. The pulsed light signal is generated through the use of a light source such as a laser, an optical switch, and two variable optical paths acting as delay elements. The variable delay elements form the basis of the system timing. The propagation time of the light signals passing through the delay elements determine the frequency of operation. The output frequency is based on the speed of light through these delay elements. The delay elements can be produced with materials that have a stable index of refraction over a temperature range and therefore the speed of light remains constant over a wide temperature range.

5 Claims, 1 Drawing Sheet

TUNABLE OPTICAL OSCILLATOR

CROSS REFERENCE TO RELATED APPLICATION

This utility patent application claims priority from and the benefit of the filing date of co-pending Provisional Patent Application Ser. No. 60/780,003 filed Mar. 7, 2006 titled "Tunable Optical Oscillator" by Stephen A. Tibbitts in accordance with 35 U.S.C. §§119(e) and 120.

TECHNICAL FIELD

Optics, Optoelectronics, Radio Frequency, Clock reference.

BACKGROUND OF THE INVENTION

Most high speed communication and navigation systems rely on accurate clock generation at both the transmitter and receiver. Often the local oscillator in the receiver needs to have an adjustable frequency in order to tune to the frequency of the incoming signal. This tuning is typically done with a Phase Locked Loop or PLL which is usually implemented using electronic circuitry. Most PLL implementations in turn employ a Voltage Controlled Oscillator or VCO to provide a variable frequency within a feedback loop. The VCO when implemented in semiconductor processing methods is composed of a fixed inductor and a variable capacitor (or varactor) forming an adjustable LC tank circuit.

The LC tank circuit operates in the electronic domain and is therefore subject to electronic noise such as fluctuations in the power supply, thermal noise, and other noise sources.

While VCOs have been developed and refined to have excellent specifications, improvements in noise characteristics are they suffer from the aforementioned noise which reduces the overall spectral purity of the output signal.

Other than electron based oscillators, optical and electro-optical methods have been developed. Many of these system base the oscillatory period on the frequency of laser light. The Brillouin Opto-Electronic Oscillator described in [2] for example derives its frequency from the beat frequency between the laser signal and the Brillouin signal. The tunable optical resonator described in [3] utilizes piezoelectric effect as well as thermal expansion to adjust the optical path length and thus change the output frequency.

REFERENCES

[1] Stephen A. Tibbitts, 2005, Frequency Generation Based on Speed of Light, US Provisional Patent Application.
[2] X. Steve Yao, 1999, Brillouin Opto-Electronic Oscillators, U.S. Pat. No. 5,917,179.
[3] Mark Arbore, Fancisc Tapos, 2003, Quasi-Monolithic Tunable Optical Resonator, U.S. Pat. No. 6,654,392 B1.

SUMMARY OF THE INVENTION

It is therefore an object of the present invention to provide for a technology that generates tunable timing signals based on a fundamental physical constant, the speed of light.

It is a further object of the present invention to provide for an oscillator which achieves the above object and which also operates in the photonic domain.

It is yet another object of the present invention to provide for an oscillator technology which achieves the above objects and which also lays out a path for high levels of integration with semiconductor manufacturing methods.

The invention achieves the above objects, and other objects and advantages which will become apparent from the description which follows, by providing a tunable optical oscillator based on the speed of light.

In the preferred embodiments of the invention, the tunable optical oscillator based on the speed of light is provided with all optical components.

DETAILED DESCRIPTION OF THE PREFERRED EMBODIMENTS

Figure 1:
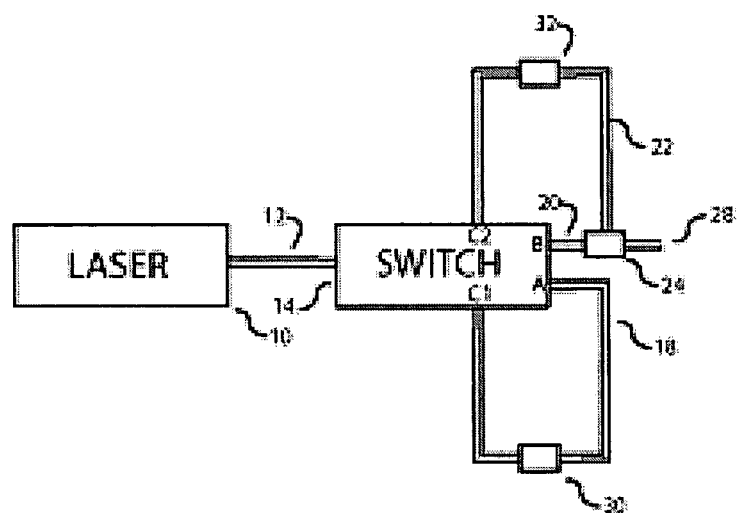
FIG. 1 is a schematic representation of the invention.

A tunable optical oscillator based on the speed of light, in accordance with the principles of the invention is generally used to produce a variable frequency pulsed light signal with low jitter, low drift and high spectral purity. This light signal can be used directly to provide a clock signal to other components or can be converted to an electrical signal and used to drive the same. The pulsed light signal is generated through the use of a light source such as a laser, an optical switch, two variable delay elements and two optical paths acting as fixed delay elements. The delay elements form the basis of the system timing. The propagation time of the light signals passing through the delay elements determine the frequency of operation. Thus, the output frequency is based on the speed of light through these optical delay elements.

One embodiment of the invention is described with indicated reference numerals as shown in the figures. Referring to FIG. 1, an optical source such as a LASER 10 provides a steady light amplitude, phase, and frequency to optical path 12. The switch 14 is a double pole light controlled switch which by default connects light path 12 to light path 18. The light beam propagates through light guide 18 and through the variable light delay 30 until it reaches the control point C1 on switch 14. Light impinging on the switch at C1 causes the switch 14 to change its path so that light now connects light path 12 to light path 20 at point B and disconnects the light at point A. The light then travels through the partial mirror 24 which directs the majority of light through light path 22. The light then propagates through light guide 22 and through the variable light delay 32 to point C2 on the switch 14, light impinging on the switch at C2 causes the switch to again change its path so that light now connects light path 12 to light path 18 at point A and disconnects path 20. Simultaneously the light from path 18 ceases to impinge on C1. Thus, the cycle repeats itself forming an all optical variable oscillator with a frequency proportional to the speed of light through delay elements 18, 30, 22, and 32. The optical delay elements 30 and 32 provide a means of changing the propagation time of light through them and thus changing the period of oscillation. The frequency of oscillation can be computed by taking inverse of the sum of the delay time for the lower path and the delay time for the upper path.

The signal is presented at 28 and can be used directly or can be converted to an electrical signal.

The LASER 10 can be implemented with a semiconductor laser or any coherent light source. Switch 14 can be implemented with differential lithium-niobate modulator, optical resonators, quantum devices or other structures suitable for such applications. Light paths 18, 20, and 22 can be implemented using silicon waveguides or optical fiber wave guides. Additionally, these light paths can be developed using athermal materials that are designed to maintain a constant speed of light through a wide temperature range. Alternately, the delay elements may be implemented with a series of ring resonators. The adjustable delay elements 30 and 32 can be implemented with a variety of components including a fiber stretcher, a piezoelectric element, optical fiber grating mirror, or electro-optic polymer. Thus, the preferred embodiment can be integrated into a monolithic or hybrid semiconductor process suitable for mass production.

Those of ordinary skill in the art will conceive of other alternate embodiments of the invention upon reviewing this disclosure. Thus, the invention is not to be limited to the above description, but is to be determined in scope by the claims which follow.

I claim:

1. A tunable optical oscillator comprising:
    a light source for providing a source of light;
    an optical switch operatively connected to the light source having first and second optical outputs and first and second optical feedback inputs, the switch being capable of directing the light into one of the two optical outputs,
    two distinct optical delay paths connecting each of the respective optical outputs with the feedback inputs so as to provide feedback into the switch, each of the optical delay paths including an optical delay element for selectively changing propagation time of the light through the delay paths; and
    an optical splitter associated with one of the delay paths for providing an optical oscillation signal with a period that is based on the speed of light.

2. The optical oscillator of claim 1, wherein the light source is substantially monochromatic.

3. The optical oscillator of claim 2 wherein the light source is a laser.

4. The optical oscillator of claim 1, wherein the optical splitter is a partial mirror.

5. The optical oscillator of claim 1, wherein the optical delay paths have substantially equal optical delays.

* * * * *